United States Patent [19]

Matsumura

[11] Patent Number: 4,674,845
[45] Date of Patent: Jun. 23, 1987

[54] STEREOSCOPIC MICROSCOPE WITH MEANS FOR VARYING STEREOSCOPIC VIEWING ANGLE

[75] Inventor: Isao Matsumura, Yokosuka, Japan

[73] Assignee: Canon Kabushiki Kaisha, Tokyo, Japan

[21] Appl. No.: 768,218

[22] Filed: Aug. 22, 1985

[30] Foreign Application Priority Data

Sep. 1, 1984 [JP] Japan ................. 59-183042
Sep. 1, 1984 [JP] Japan ................. 59-183043
Sep. 1, 1984 [JP] Japan ................. 59-183044
Sep. 1, 1984 [JP] Japan ................. 59-183049

[51] Int. Cl.⁴ ............ G02B 21/22; G02B 21/12; G02B 27/22
[52] U.S. Cl. ........................ 350/516; 350/527; 350/137
[58] Field of Search ........... 350/516, 515, 514, 513, 350/511, 502, 145, 146, 137, 138, 139, 287, 286, 445, 447, 236, 237, 523-528, 507, 505

[56] References Cited

U.S. PATENT DOCUMENTS

| 1,470,670 | 10/1923 | Heimstadt | 350/516 |
| 2,406,526 | 8/1946 | Bennett et al. | 350/515 |
| 3,173,984 | 3/1965 | Vogl | 350/516 |
| 3,186,300 | 1/1965 | Littmann | 350/515 |
| 3,971,621 | 7/1976 | Albrecht-Buehler | 350/528 |
| 4,138,191 | 2/1979 | Peyman et al. | 350/516 |
| 4,196,966 | 4/1980 | Malis | 350/145 |
| 4,285,568 | 8/1981 | Elgart | 350/528 |
| 4,492,441 | 1/1985 | Hopkins | 350/516 |

FOREIGN PATENT DOCUMENTS

| 701940 | 3/1931 | France | 350/516 |
| 29282 | of 1909 | United Kingdom | 350/286 |
| 907679 | 10/1962 | United Kingdom | 350/516 |
| 928205 | 6/1963 | United Kingdom | 350/516 |

Primary Examiner—Jon W. Henry
Attorney, Agent, or Firm—Fitzpatrick, Cella, Harper & Scinto

[57] ABSTRACT

A stereoscopic microscope comprises an object lens, a pair of stereoscopic observation optical systems arranged behind the object lens and light beam deflection means arranged between the stereoscopic observation optical systems and the object lens for varying a stereoscopic view angle.

12 Claims, 17 Drawing Figures

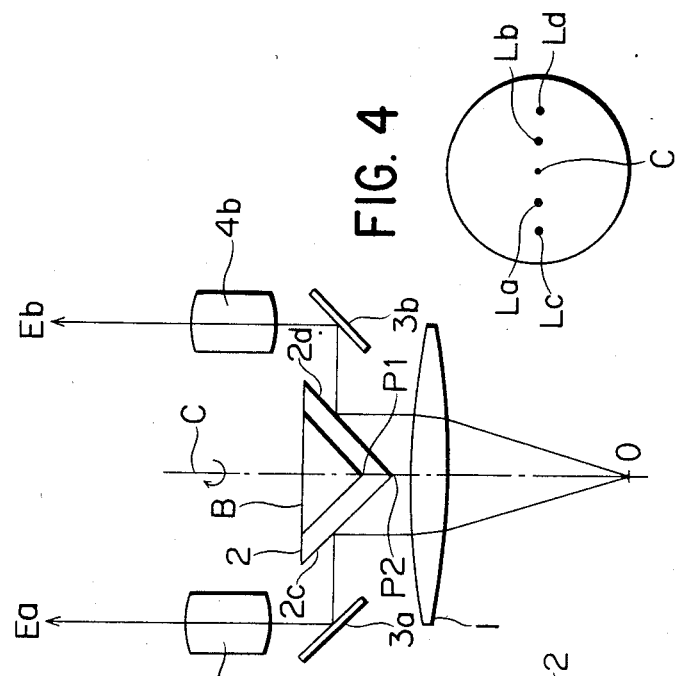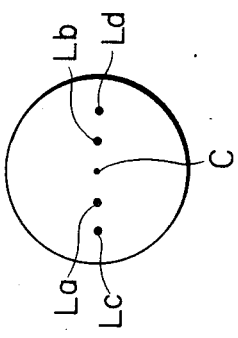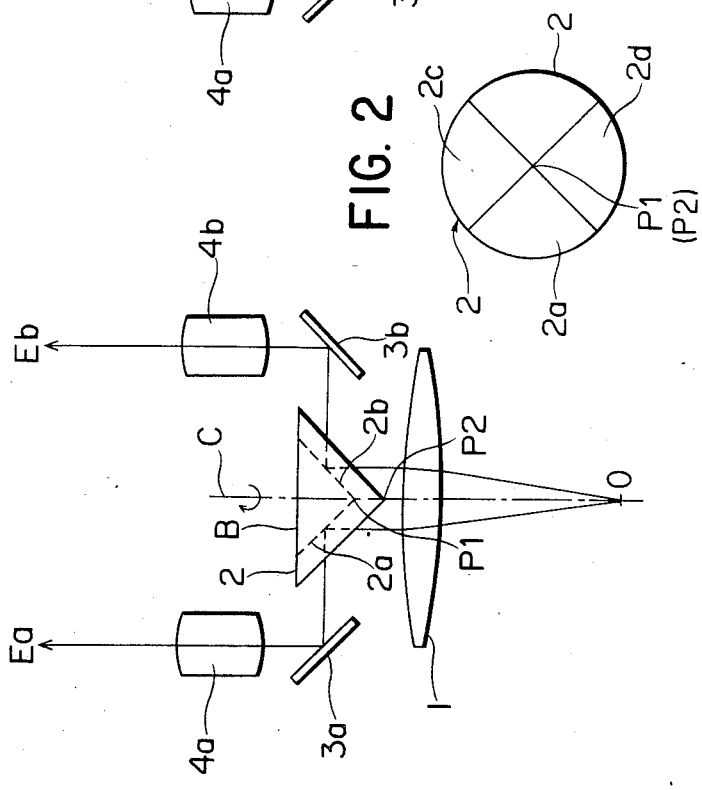

STEREOSCOPIC MICROSCOPE WITH MEANS FOR VARYING STEREOSCOPIC VIEWING ANGLE

BACKGROUND OF THE INVENTION

1. Field of the Invention

The present invention relates to a stereoscopic microscope widely used in a medical field, which can vary a stereoscopic view field for an object or an illumination angle for the object.

2. Description of the Prior Art

The stereoscopic microscope has been widely used in a medical field such as operation or inspection, a research field and an industrial field and it is useful to enhance precision and safety in the operation.

A degree of a stereoscopic image in the stereoscopic microscope is determined by observing the object with a given base line spacing between a pair of left and right observation optical systems arranged above the object. As the base line spacing increases, the stereoscopic effect increases. When a portion of the object to be observed is at a deep position, for example, in a narrow recess, illumination light does not reach it or it cannot be observed with the predetermined stereoscopic view angle. Depending on the position of the portion to be observed, it cannot be observed unless the illumination angle or the stereoscopic view angle is changed. Accordingly, in order to obtain a precise stereoscopic image, it is desired to change the illumination angle or the stereoscopic view angle during the observation.

SUMMARY OF THE INVENTION

It is an object of the present invention to provide a stereoscopic microscope which can vary a stereoscopic view angle and an illumination angle to enhance an observation capability of a portion in a recess.

It is another object of the present invention to provide a stereoscopic microscope which can continuously vary a stereoscopic view angle with a simple construction.

It is another object of the present invention which can in parallel vary the degree of stereoscopic images of a main observer and a sub-observer.

BRIEF DESCRIPTION OF THE DRAWINGS

FIG. 1 shows an optical arrangement of a first embodiment of a variable stereoscopic microscope of the present invention, FIG. 2 is a front view of a four-plane reflection prism, FIG. 3 shows an optical arrangement with the four-plane reflection prism being rotated by 90 degrees from the position shown in FIG. 1, FIG. 4 illustrates a light beam axis on the four-plane reflection prism.

DESCRIPTION OF THE PREFERRED EMBODIMENTS

Figure 5:
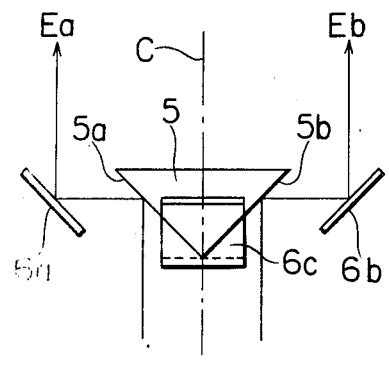
FIG. 5 shows an optical arrangement of a main portion of a second embodiment.
Figure 6:
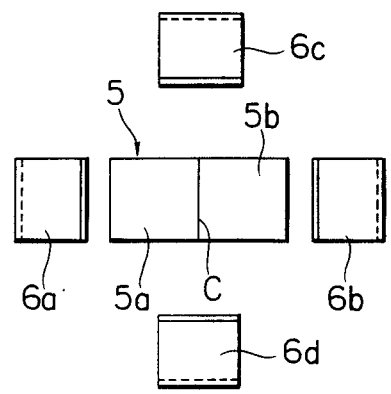
FIG. 6 shows arrangement of a triangle prism and a deflection mirror.

FIG. 1 shows a main portion of a variable stereoscopic microscope of the present invention. It comprises a pair of stereoscopic observation optical systems which uses a common object lens 1, a four-plane reflection prism 2 having four reflection planes 2a, 2b, 2c and 2d as shown in FIG. 2 is arranged behind the object lens 1. A light from an object point 0 passes through the object lens 1 and a component reflected by the reflection plane 2a of the four-plane reflection prism 2 is directed to a zoom lens 4a through a mirror 3a and then directed to an eye lens optical system Ea. A light reflected by the reflection plane 2b of the fourplane reflection prism 2 is directed to a zoom lens 4b through a mirror 3b and than directed to an eye lens optical system Eb.

The reflection planes of the four-plane reflection prism 2 are inclined by 45 degrees relative to a rear plane B but apexes of the horizontal and vertical planes are at different levels from the rear plane b. Namely, the apex of the horizontally opposing reflection planes 2a and 2b is at P1 while the apex of the vertical reflection planes 2c and 2d is at P2. The four-plane reflection prism 2 is rotatably supported around an optical axis C of the object lens 1.

FIG. 3 shows an arrangement with the four-plane reflection prism 2 being rotated by 90 degrees from the position of FIG. 1. The light from the object point 0 passes through the object lens 1, is reflected by the reflection planes 2c and 2d of the four-plane reflection prism 2, and the reflected lights pass through mirrors 3a and 3b and zoom lenses 4a and 4b, and are directed to the eye lens optical systems Ea and Eb, respectively.

FIG. 4 shows light beam axes on the four-plane reflection prism 2, La, Lb, Lc and Ld denote light beam axes on the reflection planes 2a, 2b, 2c and 2d, respectively, a base line spacing between Lc and Ld is much larger than a base line spacing between La and Lb. Thus, by rotating the four-plane reflection prism 2, the base line spacing between the light beam axes on the reflection prism 2 can be changed so that the stereoscopic angle is changed.

FIG. 5 shows another embodiment of the present invention. It does not use the four-plane reflection prism 2 but it exchanges reflectors corresponding to the mirrors 3a and 3b shown in FIGS. 1 and 3. In place of the four-plane prism 2, a triangular prism 5 having two left and right reflection planes 5a and 5b is used. A pair of left and right deflection mirrors 6a and 6b are arranged in reflection directions and another pair of deflection mirrors 6c and 6d are arranged in a direction normal to a line connecting the deflection mirros 6a and 6b.

Figure 7:
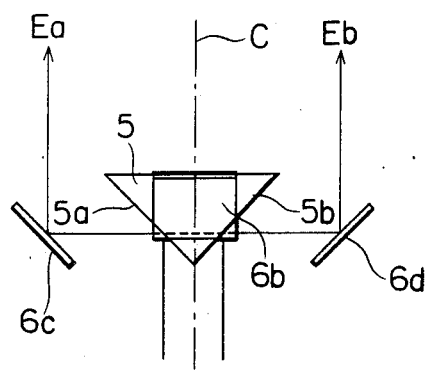
FIG. 7 shows an optical arrangement with light beam deflection means being rotated by 90 degrees from a position shown in FIG. 5.

The deflection mirrors 6a–6d are rotatably supported around the optical axis C of the object lens which passes through a crosspoint of the line connecting the pair of deflection mirrors 6a and 6b and the line connecting the pair of deflection mirrors 6c and 6d. When the deflection mirrors 6a–6d are rotated by 90 degrees as shown in FIG. 7, the line connecting the deflection mirrors 6a and 6d is slightly shifted in the direction of the optical axis C of the object lens, as seen from the comparison of the line connecting the deflection mirrors 6a and 6d shown in FIG. 5. In FIG. 7, the reflection light from the triangle prism 5 is directed to the deflection mirror 6c and 6d. Accordingly, the light path is changed and the base line spacing is changed so that the degree of stereoscopic image is changed.

Figure 8:
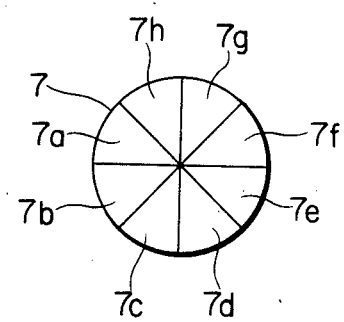
FIG. 8 is a front view of an eight-plane reflection prism.

In place of the four-plane reflection prism 2 shown in FIG. 1, an eight-plane reflection prism 7 shown in FIG. 8 may be used. The eight-plane reflection prism 7 has four steps by combinations of the reflection planes 7a and 7e, 7b and 7f, 7c and 7g, and 7d and 7h. By rotating it, four different stereoscopic images are obtained. A multi-plane prism having any number of combinations of two planes, may be used. Any combination of the deflection mirrors 6a–6d shown in FIG. 5 may be used.

Figure 9:
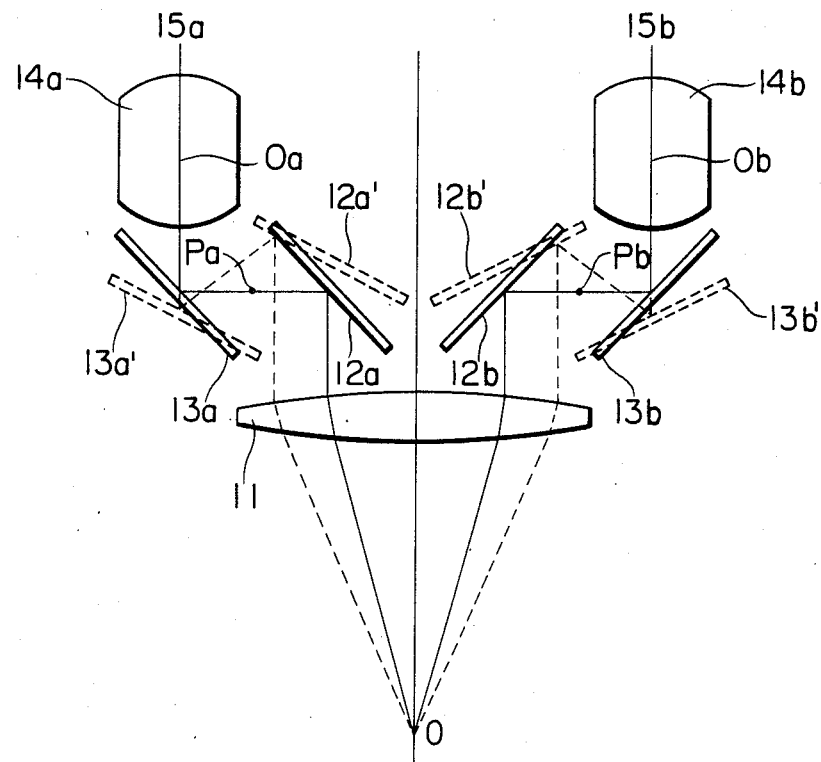
FIG. 9 shows an optical arrangement of a third embodiment.

FIG. 9 shows a third embodiment of the present invention. An object 0 is stereoscopically observed by an inspector through a common object lens 11 arranged in front of the object 0, two sets of mirrors 12a and 3a and mirrors 12b and 13b arranged parallelly behind the object lens 11, zoom variable magnification optical systems 14a and 14b arranged on optical axes Oa and Ob, and observation optical systems 15a and 15b. The two sets of mirrors 12a and 13a, and 12b and 13b are continuously rotatable around rotation axes Pa and Pb toward positions 12a' and 13a', and 12b' and 13b' shown by broken lines while keeping the parallel relationship.

A light beam emanated from the object 0 is converted to an afocal light beam by the object lens 11, and left and right split light beams are reflected by the mirrors 12a and 12b as shown by solid lines, then reflected by the mirrors 13a and 13b to the optical axes Oa and Ob, and pass through the zoom variable magnification optical systems 14a and 14b and the observation optical systems 15a and 15b.

The mirrors 12a and 13a are moved to positions 12a' and 13a', and the mirrors 12b and 13b are moved to positions 12b' and 13b' which are symmetric to the mirrors 12a and 13b with respect to the center axis of the object lens 11. Under this condition, the light beam emanated from the object 0 passes through the object lens 11, the mirrors 12a and 13a located at the positions 12a' and 13a', the zoom variable magnification optical system 14a and the observation optical system 15a, and the object lens 11, the mirrors 12b and 13b located at the positions 12b' and 13b', the zoom variable magnification optical system 14b and the observation optical system 15b, and are directed to eyes of the inspector. Thus, the stereoscopic angle to the object 0 is variable.

By rotating the parallel planar mirror to change the base line spacing of the light beam impinged to the two optical systems from the object lens 11, the degree of the stereoscopic image can be changed.

Figure 10:
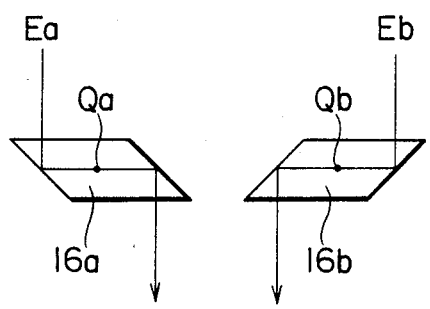
FIG. 10 illustrates a function of a parallel planar prism which is replaceable with a parallel planar mirror.

The combination of mirrors may be replaced by parallel planar prisms 16a and 16b having reflection planes as shown in FIG. 10 and the prisms 16a and 16b may be rotated around rotation axes Qa and Qb.

Figure 11:
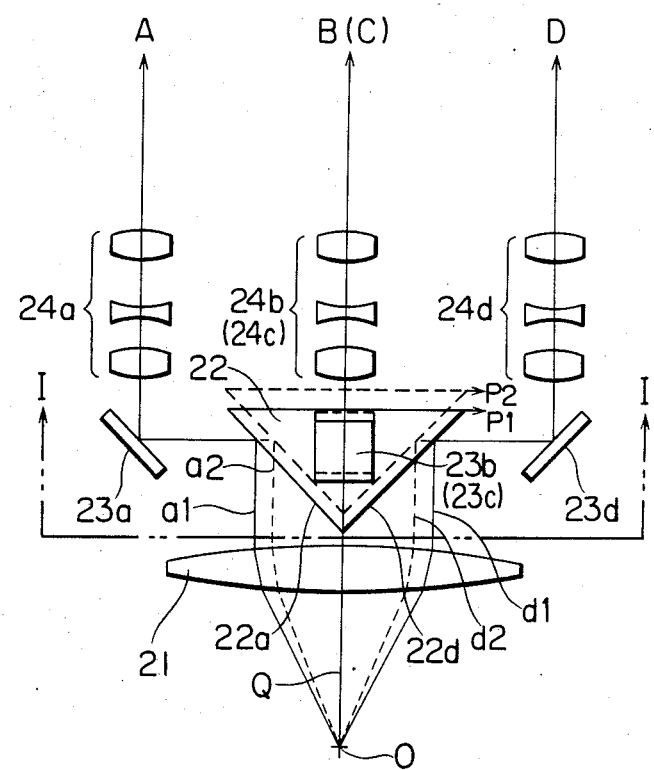
FIG. 11 shows an optical arrangement of an embodiment in which degrees of stereoscopic images by a main observer and a sub-observer can be parallelly varied.
Figure 12:
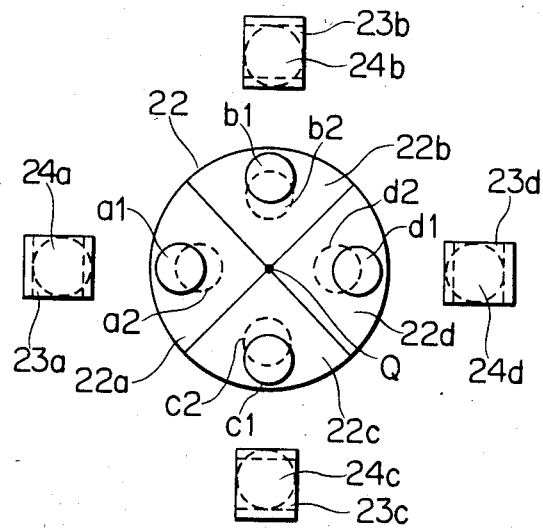
FIG. 12 is a front view taken along a line I—I of FIG. 11.

FIG. 11 shows an embodiment which allows parallel change of degrees of stereoscopic views of a main observer and a sub-observer. FIG. 12 shows an arrangement as viewed from a line I—I of FIG. 11. A light from an object point 0 passes through a common object lens 21 and is reflected by four reflection planes 22a–22d of a four-plane reflection prism 22. The reflected light beams pass through mirrors 23a–23d and zoom lenses 24a–24d and are directed to eye lenses in directions A–D. The light beam reflected by the reflection plane 22a passes through the mirror 23a and the zoom lens 24a and is directed to the eye lens in the direction A, and the light beam reflected by the reflection plane 22d which opposes to the reflection plane 22a passes through the mirror 23d and the zoom lens 24d and is directed to the eye lens in the direction D. A first stereoscopic image is formed by those two light beams. Similarly, a second stereoscopic image is formed by two light beams which are reflected by two other opposing reflection planes 22b and 22c and directed to the eye lens in the directions B and C.

The square reflection prism 22 is moved to change the stereoscopic view. In FIG. 11, when the square reflection prism 22 is moved from a solid line position P1 to a broken line position P2, the light beam which comes in the direction A is reflected by the reflection plane 22a and a light beam a1 is moved to a position a2. The light beam coming in the direction D is reflected by the reflection plane 22d and a light beam d1 is moved to a position d2. Thus, a spacing between centers of light beams a1 and d1, that is, a base line spacing changes so that the direction of the first stereoscopic image is changed. Similarly, the direction of the second stereoscopic image formed by the light beams in the directions B and C is also changed. Referring to FIG. 12, the first stereoscopic image formed by the light beams a1 and d1 changes to a2 and d2, and the second stereoscopic image formed by the light beams b1 and c1 changes to b2 and c2.

Figure 13:
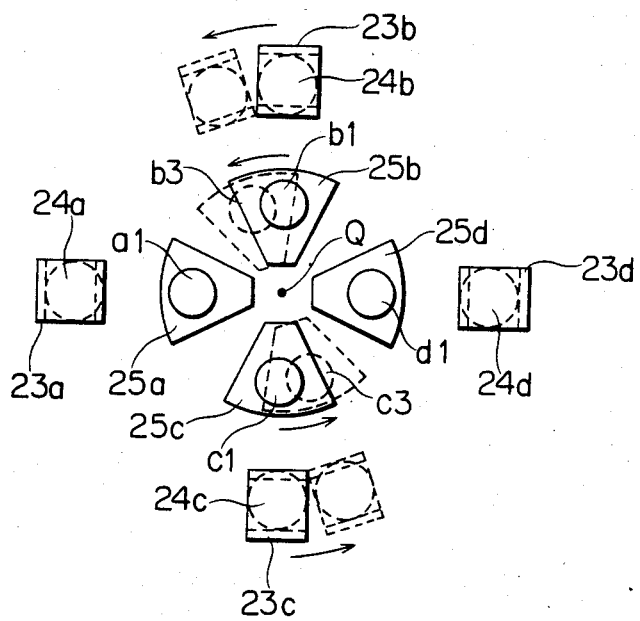
FIG. 13 is a front view similar to FIG. 12, of other embodiment.

FIG. 13 shows another embodiment. In the present embodiment, the four reflection planes 22a–22d of the square reflection prism 22 shown in FIG. 11 are replaced by four separate mirrors 25a–25d. Other arrangement is similar to that of FIG. 11. The like numerals to those shown in FIG. 11 designate the like elements.

In the present embodiment, a first stereoscopic image is formed by the light beam a1 which is formed by the zoom lens 24a, mirror 23a and mirror 25a, and the light beam d1 which is formed by the zoom lens 24d, mirror 23d and mirror 25d. A second stereoscopic image is formed by the light beam b1 which is formed by the zoom lens 24b, mirror 23b and mirror 25b, and the light beam c1 which is formed by the zoom lens 24c mirror 23c and mirror 25c. If those four light beams a1, b1, c1 and d1 are at equal distance from the center axis Q of the object lens 1, the degrees of the two stereoscopic views are equal.

When the light flux axis defined by the zoom lens 24b, mirror 23b and mirror 25b, and the light beam axis defined by the zoom lens 24c, mirror 23c and mirror 25c are rotated around the center axis Q of the object lens 21 in a direction of an arrow, the zoom lens 24b and 24c the mirrors 23b and 23c and the mirrors 25b and 25c are rotated to broken line positions and the light beams b1 and c1 are also rotated to positions b3 and c3. By simultaneously moving the mirrors 25a–25d along the center axis Q, the degree of the stereoscopic view is varied as shown in FIG. 11. In the present embodiment, an angle made by the view direction by the main observer and the view direction by the sub-observer can be set to other than right angle. Thus, the position of the sub-observer may be changed relative to the position of the main observer.

In the present embodiment, the square reflection prism 22 or the mirrors 25a–25d are moved in order to vary the degree of stereoscopic view. Alternatively, the mirrors 23a–23d may be relatively moved in the same direction, or the mirrors 25a–25d may be radially moved from the center axis 0 of the object lens 21.

Figure 14:
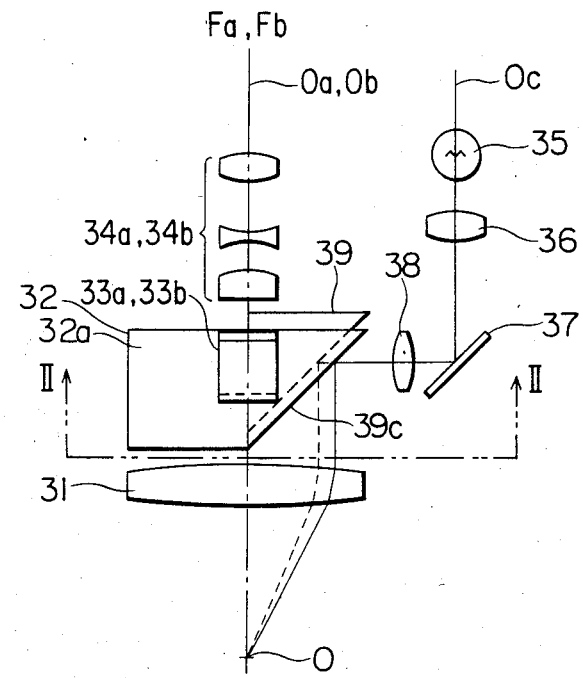
FIG. 14 shows an arrangement of an optical system of an embodiment for varying an illumination angle.
Figure 15:
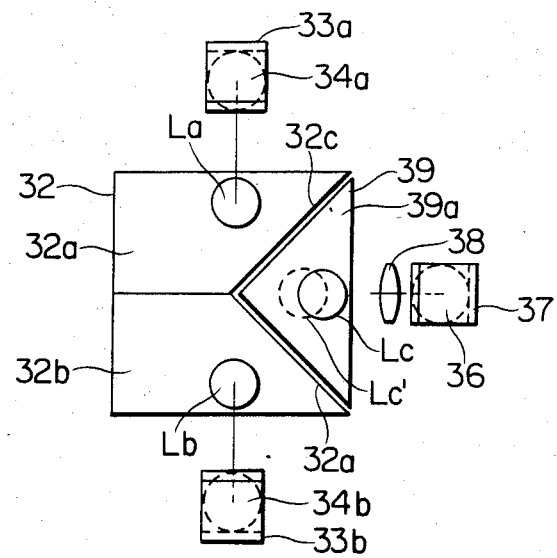
FIG. 15 shows an arrangment as viewed in a direction II—II of FIG. 14.

FIG. 14 shows an arrangement of an optical system in an embodiment in which an illumination angle is varied, and FIG. 15 shows an arrangement of the embodiment viewed in a direction II—II of FIG. 14. An object 0 is stereoscopically observed by an inspector through a common object lens arranged in front of the object 0, an observation prism 32 arranged behind the object lens 31 and having two reflection planes 32a and 32b, mirrors 33a and 33b arranged on optical axis Oa and Ob, and finder optical systems Fa and Fb including beam splitters and eye pieces.

An illumination optical system comprises a light source 35, a condenser lens 36 arranged on an optical axis Oc of the light source 35, a mirror 37 for deflecting a light path, a relay lens 38 and a movable prism 39 arranged behind the object lens 31. The movable prism 39 has a side sectional shape which fits to a v-shaped groove 32c formed on a side of the observation prism 32 and has a reflection plane 39c for deflecting the light from the relay lens 38 to the object lens 31, and it is slidable along the observation prism 32 in parallel to the center axis of the object lens 1.

The light emanated from the light source 35 passes through the condenser lens 36, is reflected by the mirror 37, passes through the relay lens 38, is reflected by the reflection plane 39c of the movable prism 39, passes through the object lens 31 and illuminates the object 0 obliquely. The light beam emanated from the object 0 is deflected by the object lens 31 and split into two light beams by the reflection planes 32a and 32b of the observation optical system prism 32. The split light beams are reflected at La and Lb of the mirrors 33a and 33b, pass through the zoom lens systems 34a and 34b and are directed to the finder optical systems Fa and Fb so that they are stereoscopically observed.

When the illumination system movable prism 39 is moved upward along the center axis of the object lens 31 as shown by a broken line, the reflection position of the illumination light beam is moved from Lc to Lc' so that the illumination is done from a position closer to the center axis than the position before the movement. By continuously moving the illumination system movable prism 39 along the center axis of the object lens 31, the illumination angle to the object 0 can be continuously changed. Similarly, by continuously moving the observation system prism 32 along the center axis of the object lens 31, the stereoscopic view angle can be continuously varied.

Figure 16:
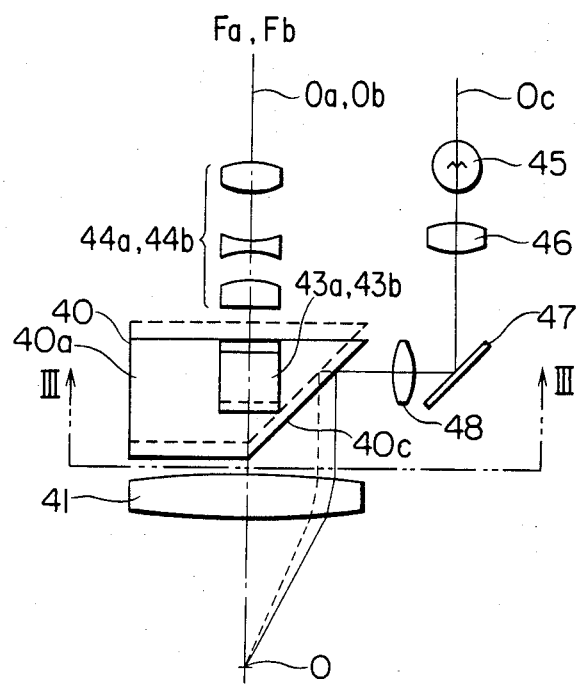
FIG. 16 shows an arrangment of an optical system of other embodiment for varying the illumination angle.
Figure 17:
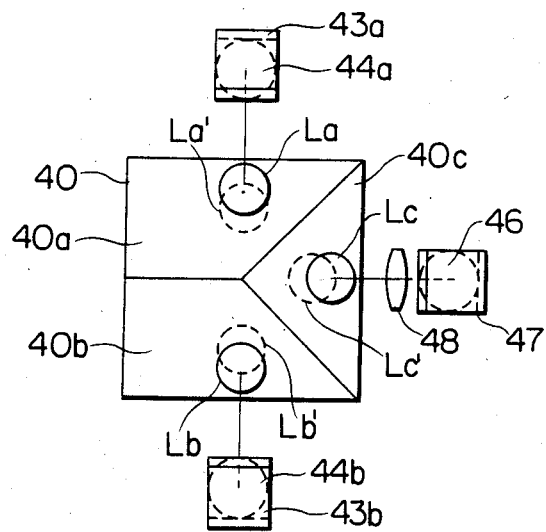
FIG. 17 shows an arrangement viewed in a direction III—III of FIG. 16.

FIG. 16 shows an arrangement of an optical system of an embodiment in which the illumination angle and the stereoscopic view angle are simultaneously varied, and FIG. 17 shows an arrangement of the optical system as viewed in a direction III—III of FIG. 16. The like numerals to those shown in FIGS. 14 and 15 designate the like elements. In the present embodiment, one movable prism 40 is shared by the observation system prism and the illumination system movable prism. The reflection planes 40a and 40b are used by the observation system prism and the reflection plane 40c is used by the illumination system movable prism. The movable prism 40 is movable along the center axis of the object lens 41.

In FIG. 16, when the movable prism 40 is moved from the solid line position to the broken line position, the reflection position of the illumination light beam is moved from Lc on the reflection plane 40c shown in FIG. 17 to Lc', and the reflection positions of the observation light beams are moved from La and Lb on the reflection planes 40a and 40b to La' and Lb' so that the illumination light flux and the observation light flux approach to the center axis of the object lens 1 with the same bare line spacing. That is, the stereoscopic view angle and the illumination angle are changed at the same angle rate.

When the illumination angle and the stereoscopic view angle are to be changed at the same rate depending on the application of the stereoscopic microscope, the embodiment of FIG. 16 is preferable to the embodiment of FIG. 14. However, the embodiment of FIG. 14 has a wider application because the illumination system movable prism 39 and the observation system prism 32 can be moved either parallelly or singly.

In the above embodiment, the observation system prism is moved as a single unit. Alternatively, the observation system prism may be divided into a plurality of sections. The direction of movement of the prism is not limited to the direction of the center axis of the object lens but the prism may be radially moved from the optical axis of the object lens. By moving the prism away from the center axis, the base line spacing to the center axis is increased so that the base line spacing can be adjusted as can be done in the previous embodiment in which the prism is moved along the center axis of the object lens.

In addition to the prism, the mirrors 33a, 33b and 37 or 43a, 43b and 47 may be moved in union or independently in the direction of the center axis of the object lens or in the radial direction normal to the center axis. For example, in FIG. 14, if the illumination system movable prism 39 is fixed and the mirror 37 is moved upward along the center axis of the object lens 31, the base line spacing to the center axis of the object lens 31 is widened. When the movable prism 39 and the mirror 37 are simultaneously moved in the opposite directions, for example, the mirror 37 is moved upward and the movable prism 9 is moved downward, the base line spacing can be more effectively widened.

What I claimed is:

1. A stereoscopic micrscope comprising:
   an object lens;
   a pair of stereoscopic observsation optical systems arranged behind the object lens to be used for obsrvation through the object lens; and
   light beam deflection means arranged in a light path between the stereoscopic observation optical systems and the object lens for varying a stereoscopic angle, wherein said light beam deflection means is a rotating polygon reflector rotatable around an optical axis of said object lens and having a reflective surface stepped in the direction of the optical axis of said object lens.

2. A stereoscopic microscope comprising:
   an object lens;

a pair of stereoscopic observation optical systems arranged behind the object lens to be used for observation through the object lens; and light beam deflection means arranged in a light path between the steroscopic observation optical systems and the object lens for varying a stereoscopic angle, wherein said light beam deflection means includes a plurlaity of sets of deflection mirrors arranged at different positions along the direction of the optical axis of said object lens which mirrors are rotatable in unison around the optical axis of said object lens.

3. A stereoscopic microscope comprising:

an object lens;

a pair of stereoscopic observation optical systems arranged behind the object lens for observation through the object lens at a stereoscopic angle; and light beam deflection means arranged in a light path between the stereoscopic observation optical systems and the object lens for varying the stereoscopic angle of said pair of stereoscopic observation optical systems, said light beam deflection means including two sets of parallel reflection surfaces, wherein each set can positionally swing in symmetry with the other set about the optical axis of said object lens.

4. A stereoscopic microscope according to claim 3, wherein each of said two sets of parallel reflection surfaces are opposed faces of a rhombic prism.

5. A stereoscopic microscope comprising:

an object lens;

a pair of first stereoscopic observation optical systems arranged behind the object lens for observation through the object lens at a stereoscopic angle;

a pair of second stereoscopic observation optical systems, whose optical axes are arranged in a plane crossing a plane containing the optical axes of said pair of first stereoscopic observation optical systems, for observation through the object lens at a stereoscopic angle; and light beam deflection means having two pairs of deflecting surfaces for the respective stereoscopic observation optical systems, arranged in a light path between the stereoscopic observation optical systems and the object lens, for simultaneously varying the stereoscopic angle of each of the two pairs of stereoscopic observation optical systems.

6. A stereoscopic microscope according to claim 5, wherein the planes containing the optical axes of said first and second stereoscopic observation optical systems intersect at an angle that can be varied and said pairs of deflecting surfaces can be relatively rotated to each other around the optical axis of said object lens.

7. A stereoscopic microscope comprising:

an object lens;

a pair of first stereoscopic observation optical systems arranged behind the object lens for observation of an object through the object lens at a stereoscopic view angle;

a pair of second stereoscopic observation optical systems, whose optical axes are arranged in a plane crossing a plane containing the optical axes of said pair of first stereoscopic observation optical systems, for observation of the object through the object lens at a stereoscopic view angle; and light beam deflection means, arranged in a light path between the stereoscopic observation optical system and the object lens, for varying stereoscopic view angles, said light beam deflection means including a set of four mirrors and a reflector having four reflection planes facing said mirrors, said set of mirrors and the reflector being movable relative to each other in the direction of the optical axis of said object lens so as to vary simultaneously the stereoscopic view angles of said first and second stereoscopic observation optical systems, while maintaining the same image sizes of the object observed therethrough.

8. A stereoscopic microscope comprising:

an object lens;

a pair of first stereoscopic observation optical systems arranged behind the object lens for observation of an object through the object lens at a stereoscopic view angle;

a pair of second stereoscopic observation optical systems, whose optical axes are arranged in a plane crossing a plane containing the optical axes of said pair of first stereoscopic observation optical systems, for observation of the object through the object lens at a stereoscopic view angle; and light beam deflection means, arranged in a light path between the stereoscopic observation optical system and the object lens, for varying simultaneously the stereoscopic view angles of said first and second stereoscopic observation optical systems while maintaining the same image sizes of the object observed therethrough, wherein the planes containing the optical axes of said first and second stereoscopic observation optical systems intersect at an angle that can be varied.

9. A stereoscopic microscope comprising:

an object lens;

a pair of stereoscopic observation optical systems arranged behind the object lens for observation of an object through the object lens at a stereoscopic angle;

an illuminating system, located on the same side of the object lens as said optical systems, for illuminating the object at an angle; and light beam deflection means, having at least three deflecting means, said light beam deflection means arranged in a light path between the stereoscopic observation optical systems and the object lens, and also arranged in a light path between said illuminating system and said object lens, for varying at least the angle of illumination of the object, by moving a first of said deflecting surfaces.

10. A stereoscopic microscope according to claim 9, wherein said light beam deflection means further varies the stereoscopic angle by moving a second and a third of said deflecting means.

11. A sterescopic microscope according to claim 10, wherein said light beam deflection means simultaneously varies both the illumination angle and the stereoscopic angle.

12. A stereoscopic microscope according to claim 11 wherein said light beam deflection means is one prism block, and said prism block is moved along the optical axis of said object lens.

* * * * *

UNITED STATES PATENT AND TRADEMARK OFFICE
CERTIFICATE OF CORRECTION

PATENT NO. : 4,674,845
DATED : June 23, 1987
INVENTOR(S) : ISAO MATSUMURA

It is certified that error appears in the above-identified patent and that said Letters Patent is hereby corrected as shown below:

COLUMN 3

Line 32, "3a" should read --13a--.

COLUMN 4

Line 65, "24c" should read --24c,--.

COLUMN 6

Line 54, "micrscope" should read --microscope--.
    Line 56, "observsation" should read --observation--.
    Line 57, "obsr-" should read --obser- --.

COLUMN 7

Line 5, "steroscopic" should read --stereoscopic--.
    Line 8, "plurlaity" should read --plurality--.

UNITED STATES PATENT AND TRADEMARK OFFICE
CERTIFICATE OF CORRECTION

PATENT NO. : 4,674,845

DATED : June 23, 1987

INVENTOR(S) : ISAO MATSUMURA

It is certified that error appears in the above-identified patent and that said Letters Patent is hereby corrected as shown below:

<u>COLUMN 8</u>

Line 3, "tem" should read --tems--.
Line 57, "sterescopic" should read --stereoscopic--.

Signed and Sealed this

Twentieth Day of October, 1987

*Attest:*

DONALD J. QUIGG

*Attesting Officer*  *Commissioner of Patents and Trademarks*